Patented Aug. 14, 1951

2,564,474

UNITED STATES PATENT OFFICE 2,564,474

WELD ROD AND COATING THEREFOR

Alexander L. Feild, Baltimore, Md., assignor to Armco Steel Corporation, a corporation of Ohio No Drawing. Application January 21, 1948, Serial No. 3,541

3 Claims. (Cl. 219—8)

This invention relates to the welding of metal and more especially to a method and electrodes for producing low-carbon weld deposits and weld joints.

An object of my invention is the provision of a direct and thoroughly practical method for producing extremely low-carbon weld deposits having appreciable columbium contents.

A further object of my invention is that of providing reliable and commercially feasible arc-welding electrodes which are well suited for giving extremely low-carbon weld deposits containing columbium.

A still further object of this invention is the provision of a highly satisfactory weld rod source of extra low-carbon, austenitic chromium-nickel stainless steel weld deposits containing columbium serving to improve corrosion resistance of the deposited metal.

Other objects of the invention in part will be obvious and in part pointed out hereinafter.

The invention accordingly consists in the combination of elements, composition of materials, features of products, and in the various steps and the relation of each of the same to one or more of the others as described herein, the scope of the application of which is indicated in the following claims.

As conducive to a clearer understanding of certain features of my invention, it may be noted at this point that stainless steel is recognized as being a weldable metal, and as a filler for parent stainless steel, carbon steel or other parent metal. In general, the stainless steels usually include about 10% to 35% chromium, with or without nickel as a further element, and with or without supplemental additions of one or more such elements as manganese, silicon, cobalt, copper, molybdenum, tungsten, vanadium, columbium, titanium, and sulphur, for special purposes, and the remainder substantially all iron. While the carbon content of the steels may fall anywhere within a substantial range up to 0.50% or more, some varieties of the steels have an extremely low-carbon content, say below about 0.04%.

Certain weld rods for producing deposits of extra low-carbon steels, as for forming austenitic chromium-nickel stainless steel welds, may sometimes be satisfactorily substituted for rods which give more expensive stabilized alloys as of 18-18 chromium-nickel steel containing relatively large amounts of carbon stabilized by columbium. Without some stabilizing influence, however, whether it be by an extremely low-carbon content, or by the larger quantities of carbon along with columbium, the heretofore known austenitic stainless steel weld deposits often suffer intergranular corrosion prompted by the precipitation of chromium carbides at the metal grain boundaries. Then there are occasions where even the extra low-carbon steel deposits of the character referred to, or the relatively high-carbon columbium steel deposits, fail to offer adequate protection against corrosion. When the weld is to be used at elevated temperatures, for example, as in the presence of corrosive chemicals, a further stabilizing influence often is needed in addition to the extra low-carbon content to give improved resistance to attack from the corrosive media. A mere lowering of the carbon content of the weld, illustratively is not enough, nor sometimes in the instance of relatively high-carbon steel is the addition of columbium enough.

A prevailing practice in the prior art has been to utilize a ferro-columbium pre-alloy or the like as a weld rod source of columbium. The carbon contents of the deposits thus achieved are not extremely low. The pre-alloy source of columbium employed in fact usually contains approximately 0.15% to 0.40% carbon, a figure far too high for achieving extremely low-carbon welds having an appreciable columbium content.

An outstanding object of my invention, accordingly, is the provision of strong, durable and corrosion-resistant stainless steel weld deposits containing columbium and very small quantities of carbon, employing a weld rod source for reliablly giving the desired deposit composition.

Referring now more particularly to the practice of my invention, I weld stainless steel, carbon steel, or any of a variety of other weldable metals, by melting down a source of extremely low-carbon weld deposit metal and, simultaneously, columbium oxide, such as columbium ore, using a reducing agent to yield columbium from this oxide to the deposit. I prefer to deposit these ingredients to the parent metal from a weld rod or electrode containing the same, the columbium oxide advantageously being in a coating over an extremely low-carbon core. The core for example is made of stainless steel containing on the order of 0.03% carbon as a maximum value and is further suited to give a stainless steel deposit of particular composition. Columbium oxide, such as the ore, I find importantly is ordinarily substantially free of carbon; the carbon content is only about 0.02% to 0.03% or less, a negligible amount which will not substantially contaminate the weld.

The columbium oxide reducing agent which I use preferably is ferro-aluminum or a silicon-reducing agent such as ferro-silicon. Sometimes the agent is a mixture of two or more materials, as for example the ferro-aluminum and the ferro-silicon. Usually, I mix the columbium oxide and the reducing agent with such materials as limestone, fluorspar and asbestos, all in finely divided condition, and introduce a binder, illustratively sodium silicate, thus forming a flux coating. There are occasions too where I include pulverized metallic constituents such as sources of chromium and nickel in the coating, but these materials usually are not preferred because of the difficulty of providing sufficiently low-carbon grades which can be used.

Before mixing the coating ingredients and adding the binder, I sometimes subject the asbestos ingredient to a high temperature drying treatment, and accordingly remove any amounts of water therefrom which might yield hydrogen to the weld. I usually heat the less stable ingredients of the flux at a lower temperature than the asbestos to remove any water which they also may contain. In so treating the flux materials, I usually employ high enough temperatures and a long enough period of treatment to remove both moisture and the water of constitution. For this purpose, the less stable materials are heated below their decomposition temperatures, conveniently after being mixed with the relatively stable asbestos and after coating onto the weld rod core. In the latter instance, the flux dries on the core as heated, thereby giving a weld rod which is substantially free of water acting as a source of hydrogen to the weld. I also prefer to avoid the use of any other sources which might yield hydrogen to the weld, thus tending to prevent the development of interfacial cracks and embrittlement of the weld attributable to hydrogen.

In introducing ferro-silicon as a reducing material for the columbium oxide of the flux, I observe the precaution of employing a sufficiently low-carbon grade of the ferro-alloy to assure the critically low-carbon content of the weld. For this purpose at times I screen crushed low-carbon ferro-silicon to remove an appreciable quantity of the finer particles which often contain a greater concentration of carbon than the coarser particles. Then by crushing the coarser particles to a suitable size and including the same in the weld rod flux, I have an extremely low-carbon reducing material for the columbium oxide.

The particular amount of the reducing agent, such as the ferro-silicon, is best in excess or slightly in excess of the quantity called for by stoichiometric calculation assuming complete columbium oxide reduction. In use, the melting of the weld rod and the coating, as with electric arc welding equipment, supplies molten core metal, thus forming an alloy deposit with columbium coming from the columbium oxide. The actual recovery of columbium achieved on the basis of the calculation referred to usually is better than about 35% ranging up to 50% or more as evidenced by the deposit. My weld rod core source of metal supply yields a low-carbon deposit containing about 0.04% carbon as a maximum value. The columbium oxide and other ingredients of the rod introduce no substantial quantity of carbon to the weld.

As illustrative of the practice of my invention, I provide an extremely low-carbon, austenitic stainless steel core wire containing about 0.029% carbon, 19.69% chromium, 10.42% nickel, 1.51% manganese, 0.50% silicon, 0.018% sulphur, 0.027% phosphorus, and the remainder substantially all iron. Onto this wire, I coat as by extrusion or dipping, a paste type flux containing by weight about 11.0% columbium ore, 5.5% ferro-silicon (50%), 33.4% limestone, 29.2% fluorspar, 8.4% asbestos (preferably heat-treated as for one hour at 2000° F. to remove both moisture and water of constitution before being mixed with the other ingredients), and 12.5% sodium silicate. After applying the flux coating, I bake the resulting rod preferably at about 600° F. for 12 hours to dry out the paste, thus giving a substantially moisture-free hard coating.

A welded joint made between two stainless steel members by fusing one of the coated rods just described was found to contain, at the weld, about 0.035% carbon, 18.46% chromium, 10.48% nickel, 0.51% columbium, 1.05% manganese, 0.44% silicon, 0.019% sulphur, 0.026% phosphorus, and the remainder substantially all iron, this composition for example being approximately the same as that of the parent metal except that the latter while being an extremely low-carbon, austenitic chromium-nickel stainless steel, illustratively contained no columbium. The percentage of columbium recovered from the ore to the weld was in the vicinity of 36%; the increase in carbon content from core wire to weld metal was only 0.006%. Further, the extremely low-carbon, columbium-containing weld was found to be stable under corrosive conditions even at elevated temperatures. The weld by virtue of the carbon and columbium contents thereof was substantially free of intergranular corrosion even after a prolonged period of time.

The weld rods which I provide are thoroughly capable of giving weld deposits having an extremely low-carbon content and of adding columbium to the deposit. Also, my rods are successfully made and used to give any of a variety of deposit compositions, for example depending upon the particular rod ingredients and the amounts thereof available as a source of the weld metal. Further, my method of providing extremely low-carbon welds is reliable and effective and depends upon an oxide source for assuring an extremely low-carbon yield of columbium, the oxide being a relatively inexpensive source of the metal and being readily useful as an extremely low-carbon ingredient.

Thus it will be seen that in this invention there are provided a method and weld rod for producing low-carbon deposits and welded joints having appreciable columbium contents, wherein the various objects hereinbefore set forth together with many practical advantages are successfully achieved. It will be seen that the products and method are commercially feasible and assure an effective yield of weld metal.

As many possible embodiments may be made of my invention and as many changes may be made in the embodiments herinbefore set forth, it is to be understood that all matter described herein is to be interpreted as illustrative and not as a limitation.

I claim:

1. A weld rod for providing a stainless steel weld deposit of extra low carbon content, comprising in combination, a stainless steel core containing 10% to 35% chromium and having a carbon content not exceeding 0.03%; and a coating on said core including a columbium oxide having a carbon content not exceeding 0.03%, crushed ferro-silicon relieved of fines and having an extremely low carbon content for reducing the columbium oxide, a flux material, and a binder.

2. A weld rod for providing a stainless steel weld deposit of extra low carbon content, comprising in combination, a stainless steel core containing 10% to 35% chromium and having a carbon content not exceeding 0.03%; and a coating on said core including a columbium oxide having a carbon content not exceeding 0.03%, a ferro-aluminum reducing agent for the columbium oxide having an extremely low carbon content, a flux material, and a binder.

3. A weld rod for providing a stainless steel weld deposit of extra low carbon content comprising in combination, a core containing about 0.03% maximum carbon content, about 21% chromium, about 10% nickel, about 1.5% manganese, with remainder substantially all iron; and a coating on said core containing columbium ore having a carbon content not exceeding 0.03%, crushed ferro-silicon relieved of fines and having an extremely low carbon content and being in amount in excess of that necessary to reduce the ore, a flux of limestone and fluorspar in major amount and asbestos in minor amount, and a sodium silicate binder.

ALEXANDER L. FEILD.

REFERENCES CITED

The following references are of record in the file of this patent:

UNITED STATES PATENTS

| Number | Name | Date |
|---|---|---|
| 1,872,254 | DeGolyer | Aug. 16, 1932 |
| 1,954,296 | Keir | Apr. 10, 1934 |
| 2,011,706 | Blumberg | Aug. 20, 1935 |
| 2,190,486 | Schafmeister | Feb. 13, 1940 |
| 2,241,563 | Wall | May 13, 1941 |
| 2,320,260 | Browne | May 25, 1943 |
| 2,336,237 | Feild | Dec. 7, 1943 |
| 2,435,504 | Mathias | Feb. 3, 1948 |

FOREIGN PATENTS

| Number | Country | Date |
|---|---|---|
| 298,598 | Great Britain | Mar. 14, 1929 |
| 459,366 | Great Britain | Jan. 4, 1947 |

OTHER REFERENCES

The Book of Stainless Steels, 2nd. Ed., 1935, pages 391 and 392. Published by The American Society for Metals.

The Alloys of Iron and Chromium, volume II, 1940, 380, by Kinzel and Franks.